United States Patent
Collings

(10) Patent No.: US 7,483,125 B2
(45) Date of Patent: Jan. 27, 2009

(54) METHOD FOR WAVELENGTH INDEPENDENT DISPERSION PENALTY MEASUREMENT

(75) Inventor: Brandon C. Collings, Middletown, NJ (US)

(73) Assignee: Ciena Corporation, Linthicum, MD (US)

( * ) Notice: Subject to any disclaimer, the term of this patent is extended or adjusted under 35 U.S.C. 154(b) by 296 days.

(21) Appl. No.: 11/446,909

(22) Filed: Jun. 5, 2006

(65) Prior Publication Data

US 2006/0290918 A1    Dec. 28, 2006

Related U.S. Application Data

(60) Provisional application No. 60/688,934, filed on Jun. 9, 2005.

(51) Int. Cl.
*G01N 21/00* (2006.01)
(52) U.S. Cl. .................... 356/73.1; 358/23; 358/24; 358/27; 358/122
(58) Field of Classification Search ............... 356/73.1; 385/23, 24, 27, 122
See application file for complete search history.

(56) References Cited

U.S. PATENT DOCUMENTS

| | | | | |
|---|---|---|---|---|
| 6,124,960 | A * | 9/2000 | Garthe et al. | 398/194 |
| 6,137,604 | A * | 10/2000 | Bergano | 385/122 |
| 6,433,923 | B2 * | 8/2002 | Tanaka et al. | 359/337 |
| 6,819,476 | B2 * | 11/2004 | Hunt | 359/326 |
| 6,819,478 | B1 * | 11/2004 | Islam | 359/334 |

* cited by examiner

*Primary Examiner*—L. G Lauchman
*Assistant Examiner*—Iyabo S Alli
(74) *Attorney, Agent, or Firm*—Clements Bernard Miller; Christopher L. Bernard; Tyler S. Brown

(57) ABSTRACT

The present invention provides a method for the wavelength independent measurement or testing of the dispersion penalty, or dispersion tolerance, of optical transmitters that comprises a single setup, measures or tests the components only to a specified amount of dispersion, and not beyond, improves yield, and reduces component cost. This method utilizes a predetermined physical length of non-dispersion shifted fiber (NDSF) combined with a dispersion compensating module (DCM) that is designed for use with non-zero dispersion shifted fiber (NZDSF). As the dependence of the dispersion with wavelength of NZDSF is different from that of NDSF, by combining the proper physical length of NDSF and DCM designed for use with NZDSF, the total dispersion of the two elements can be made constant as a function of wavelength.

21 Claims, 3 Drawing Sheets

METHOD FOR WAVELENGTH INDEPENDENT DISPERSION PENALTY MEASUREMENT

CROSS-REFERENCE TO RELATED APPLICATION(S)

The present non-provisional patent application claims the benefit of priority of U.S. Provisional Patent Application No. 60/688,934, filed on Jun. 9, 2005, and entitled "METHOD FOR WAVELENGTH INDEPENDENT DISPERSION PENALTY MEASUREMENT," which is incorporated in-full by reference herein.

FIELD OF THE INVENTION

The present invention relates generally to the telecommunications and optical networking fields. More specifically, the present invention relates to a method for the wavelength independent measurement or testing of the dispersion penalty, or dispersion tolerance, of optical transmitters. Advantageously, this method for the wavelength independent measurement or testing of the dispersion penalty, or dispersion tolerance, of optical transmitters comprises a single setup, measures or tests the components only to a specified amount of dispersion, and not beyond, improves yield, and reduces component cost.

BACKGROUND OF THE INVENTION

Chromatic dispersion is based on the principal that different colored pulses of light, with different wavelengths, travel at different speeds, even within the same mode, and is the sum of material dispersion and waveguide dispersion. Material dispersion is caused by the variation in the refractive index of the glass of a fiber as a function of the optical frequency. Waveguide dispersion is caused by the distribution of light between the core of a fiber and the cladding of a fiber, especially with regard to a single-mode fiber. Chromatic dispersion concerns are compounded in today's high-speed transmission optical networks.

Currently, the chromatic dispersion penalty, or chromatic dispersion tolerance, of optical transmitters is measured or tested using physical lengths of conventional non-dispersion shifted fiber (NDSF) conforming to International Telecommunications Union (ITU) standard G.652. In general, NDSF has its dispersion null point, at which waveguide and material chromatic dispersion cancel each other out, near a wavelength of 1310 nm. The specification for the amount of dispersion that an optical transmitter must tolerate is given as a uniform value based on the bit rate of the optical transmitter, independent of the optical transmitter's wavelength. For example, 2.5 Gb/s optical signals generally can tolerate up to 16000 ps/nm of dispersion, 10 Gb/s optical signals generally can tolerate up to 1000 ps/nm of dispersion, and 40 Gb/s optical signals generally can tolerate up to 60 ps/nm of dispersion, However, the amount of dispersion present in NDSF per unit length is strongly dependent upon the optical transmitter's wavelength, and varies approximately linearly from 16.2 ps/nm/km at 1530 nm to 17.5 ps/nm/km at 1550 nm to 18.5 ps/nm/km at 1565 nm. Thus, the wavelength dependent dispersion slope of NDSF is approximately 0.061 ps/nm$^2$/km.

The dispersion penalty, or dispersion tolerance, of optical transmitters is measured or tested in order to determine whether or not a given optical transmitter meets the required specification. As described above, existing measurement or testing methods use using physical lengths of conventional NDSF with known dispersion characteristics. Such methods, however, do not account for the wavelength-dependent dispersion slope of NDSF.

For the ease of measurement or testing during manufacturing, it is desirable for a component vendor to use only a single setup with a single physical length of NDSF for optical transmitters of all wavelengths. In order to guarantee a wavelength independent dispersion tolerance, a physical length of fiber that provides the specified amount of dispersion is computed at the short end of the applicable wavelength spectrum. In other words, when using a single physical length of NDSF to perform a measurement or test of the dispersion penalty of an optical transmitter at any given wavelength to a wavelength independent amount of total dispersion, the physical length of NDSF needed is determined at the short end of the applicable wavelength spectrum. As a result, due to the wavelength dependent dispersion slope of NDSF, the dispersion tolerance at all longer wavelengths is increasingly greater than the specification, resulting in the over testing of the components, lower yield, and increased component cost. For example, if the wavelength independent dispersion specification of a 10 Gb/s optical transmitter is 1600 ps/nm, then approximately 100 km of NDSF is needed to generate 1600 ps/nm dispersion at 1530 nm. At 1565 nm, the dispersion is 1840 ps/nm, or 114% of the wavelength independent dispersion specification. As the dispersion penalty as a function of dispersion is effectively quadratic, this difference in total dispersion amount results in an over testing of the dispersion penalty by 132%.

Thus, what is needed in the art is a method for the wavelength independent measurement or testing of the dispersion penalty, or dispersion tolerance, of optical transmitters that comprises a single setup, measures or tests the components only to a specified amount of dispersion, and not beyond, improves yield, and reduces component cost.

BRIEF SUMMARY OF THE INVENTION

In various exemplary embodiments, the present invention provides a method for the wavelength independent measurement or testing of the dispersion penalty, or dispersion tolerance, of optical transmitters that comprises a single setup, measures or tests the components only to a specified amount of dispersion, and not beyond, improves yield, and reduces component cost. This method utilizes a predetermined physical length of NDSF combined with a dispersion compensating module (DCM) that is designed for use with non-zero dispersion shifted fiber (NZDSF) conforming to ITU standard G.655. As the dependence of the dispersion with wavelength of NZDSF is different from that of NDSF, by combining the proper physical length of NDSF and DCM designed for NZDSF, the total dispersion of the two elements can be made constant at a selected value, and as a function of wavelength.

In one exemplary embodiment of the present invention, a method for the wavelength independent measurement or testing of the dispersion penalty, or dispersion tolerance, of optical transmitters, includes combining a predetermined physical length of non-dispersion shifted fiber NDSF with a DCM that is designed for use with NZDSF, thereby making the total dispersion of the two elements constant as a function of wavelength. The method also includes selecting the predetermined physical length of NDSF and the DCM based upon a desired total dispersion. The length of the predetermined physical length of NDSF is given by: $L = -D_{slope\_DCM}/D_{slope\_fiber}$, where $D_{slope\_DCM}$ is the dispersion slope of the DCM and $D_{slope\_fiber}$ is the dispersion slope per unit length of the predetermined physical length of NDSF. The total dispersion of the combined predetermined physical length of NDSF and the DCM is given by: $D=L*D_{0\_fiber}+D_{0\_DCM}$, where L is the length of the predetermined physical length of NDSF, $D_{0\_fiber}$ is the dispersion per unit length of the predetermined physical length of NDSF at a predetermined wavelength, and $D_{0\_DCM}$ is the dispersion of the DCM at the predetermined wavelength. The method further includes combining the predetermined physical length of NDSF with the DCM in a single setup.

In another exemplary embodiment of the present invention, a system for the wavelength independent measurement or testing of the dispersion penalty, or dispersion tolerance, of optical transmitters includes a predetermined physical length of NDSF and a DCM that is designed for use with NZDSF optically coupled to the predetermined physical length of NDSF, wherein the total dispersion of the two elements is constant as a function of wavelength. The predetermined physical length of NDSF and the DCM are selected based upon a desired total dispersion. The length of the predetermined physical length of NDSF is given by: $L=-D_{slope\_DCM}/D_{slope\_fiber}$, where $D_{slope\_DCM}$ is the dispersion slope of the DCM and $D_{slope\_fiber}$ is the dispersion slope per unit length of the predetermined physical length of NDSF. The total dispersion of the combined predetermined physical length of NDSF and the DCM is given by: $D=L*D_{0\_fiber}+D_{0\_DCM}$, where L is the length of the predetermined physical length of NDSF, $D_{0\_fiber}$ is the dispersion per unit length of the predetermined physical length of NDSF at a predetermined wavelength, and $D_{0\_DCM}$ is the dispersion of the DCM at the predetermined wavelength. The predetermined physical length of NDSF and the DCM are combined in a single setup.

In a further exemplary embodiment of the present invention, a method for the wavelength independent measurement or testing of the dispersion penalty, or dispersion tolerance, of optical transmitters, includes combining a predetermined physical length of non-dispersion shifted fiber NDSF with a DCM that is designed for use with one of NZDSF and dispersion shifted fiber (DSF), thereby making the total dispersion of the two elements constant as a function of wavelength.

BRIEF DESCRIPTION OF THE DRAWINGS

The present invention is illustrated and described herein with reference to the various drawings, in which like reference numbers denote like method steps or system components, as appropriate, and in which.

DETAILED DESCRIPTION OF THE INVENTION

In various exemplary embodiments, the present invention provides a method for the wavelength independent measurement or testing of the dispersion penalty, or dispersion tolerance, of optical transmitters that comprises a single setup, measures or tests the components only to a specified amount of dispersion, and not beyond, improves yield, and reduces component cost. This method utilizes a predetermined physical length of NDSF combined with a DCM that is designed for use with NZDSF. DCMs that are designed for use with NZDSF have large amounts of negative dispersion, to balance the positive dispersion of NZDSF in the 1550 nm window. Additionally, DCMs that are designed for use with NZDSF compensate for dispersion slope differences in the 1550 nm window. Specifically, DCMs that are designed for use with NZDSF provide negative dispersion that has a curve with a slope matched to the positive dispersion of the NZDSF. As the dependence of the dispersion with wavelength of NZDSF is different from that of NDSF, by combining the proper physical length of NDSF and DCM designed for use with NZDSF, the total dispersion of the two elements can be made constant at a selected value, and as a function of wavelength.

Figure 1:
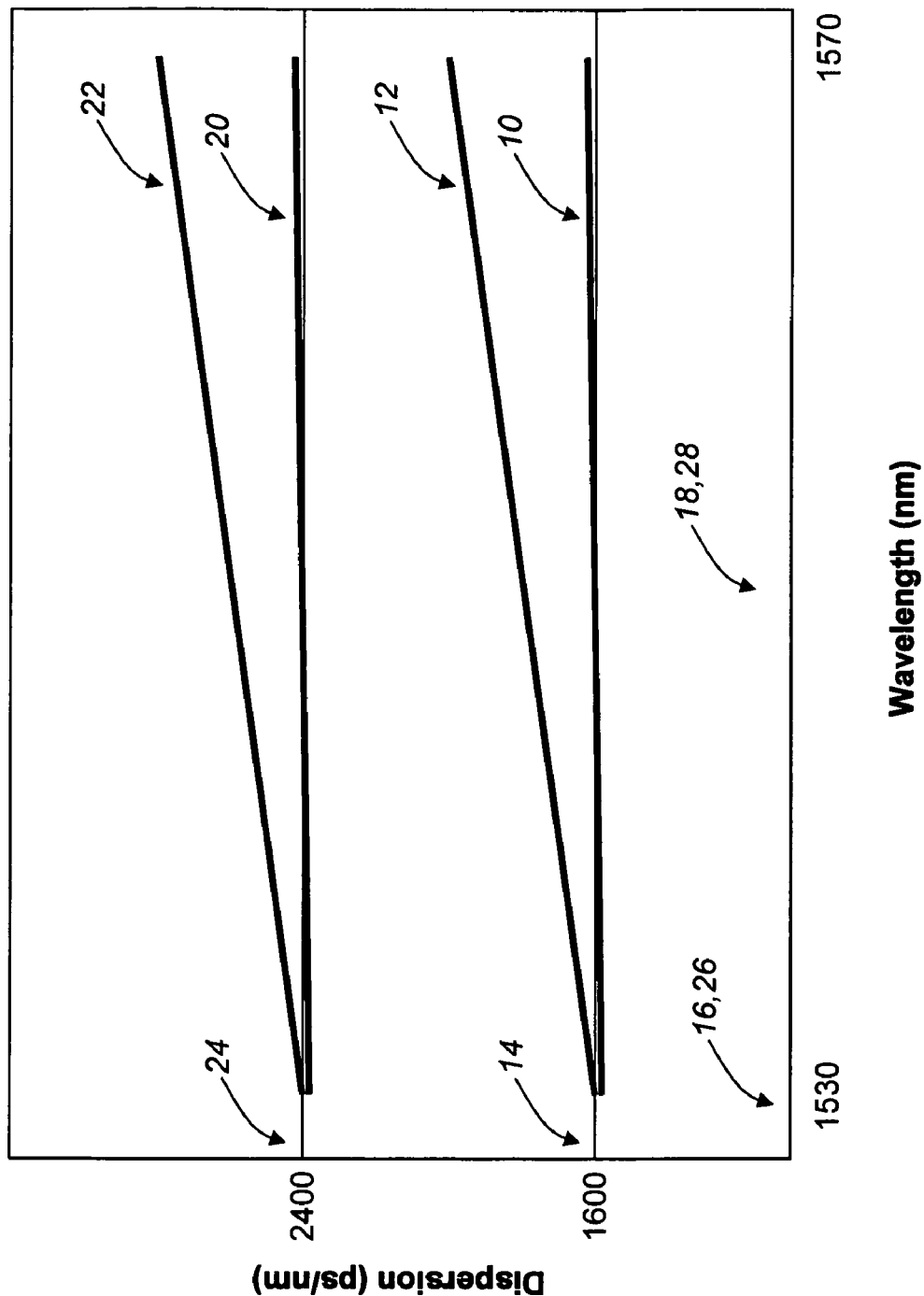
FIG. 1 is a plot illustrating the resulting dispersion with the proposed use of 110 km NDSF+DCM designed to compensate 80 km NZDSF versus the conventional use of 98 km NDSF, both targeting 1600 ps/nm dispersion at all wavelengths, and the proposed use of 165 km NDSF+DCM designed to compensate 120 km NZDSF versus the conventional use of 148 km NDSF, both targeting 2400 ps/nm dispersion at all wavelengths.

This is illustrated in FIG. 1, which shows the resulting dispersion with the proposed use of 110 km NDSF+DCM designed to compensate 80 km NZDSF 10 versus the conventional use of 98 km NDSF 12, both targeting 1600 ps/nm dispersion 14 at all wavelengths, and the proposed use of 165 km NDSF+DCM designed to compensate 120 km NZDSF 20 versus the conventional use of 148 km NDSF 22, both targeting 2400 ps/nm dispersion 24 at all wavelengths. The DCM designed to compensate 80 km NZDSF provides a nominal chromatic dispersion of −305 ps/nm at 1545 nm. The DCM designed to compensate 120 km NZDSF provides a nominal chromatic dispersion of −458 ps/nm at 1545 nm. It should be noted that, the proposed use of 110 km NDSF+DCM designed to compensate 80 km NZDSF 10 provides a near constant 1600 ps/nm dispersion 14, while the conventional use of 98 km NDSF 12 provides 1600 ps/nm dispersion 14 only at the short end 16 of the applicable wavelength spectrum 18 and increases linearly at all longer wavelengths, resulting in over testing. It should also be noted that, the proposed use of 165 km NDSF+DCM designed to compensate 120 km NZDSF 20 provides a near constant 2400 ps/nm dispersion 24, while the conventional use of 148 km NDSF 22 provides 2400 ps/nm dispersion 24 only at the short end 26 of the applicable wavelength spectrum 28 and increases linearly at all longer wavelengths, again resulting in over testing.

As described above, NDSF has its dispersion null point, at which waveguide and material dispersion cancel each other out, near a wavelength of 1310 nm. The amount of dispersion present in NDSF per unit length is strongly dependent upon the optical transmitter's wavelength, and varies approximately linearly from 16.2 ps/nm/km at 1530 nm to 17.5 ps/nm/km at 1550 nm to 18.5 ps/nm/km at 1565 nm. Thus, the wavelength dependent dispersion slope of NDSF is approximately 0.061 ps/nm$^2$/km. NZDSF, on the other hand, has a dispersion of approximately 4 ps/nm/km in the 1530-1570 nm wavelength band, thus minimizing dispersion while avoiding the undesirable effects of four-wave mixing between wavelength division multiplexed (WDM) channels.

Figure 2:
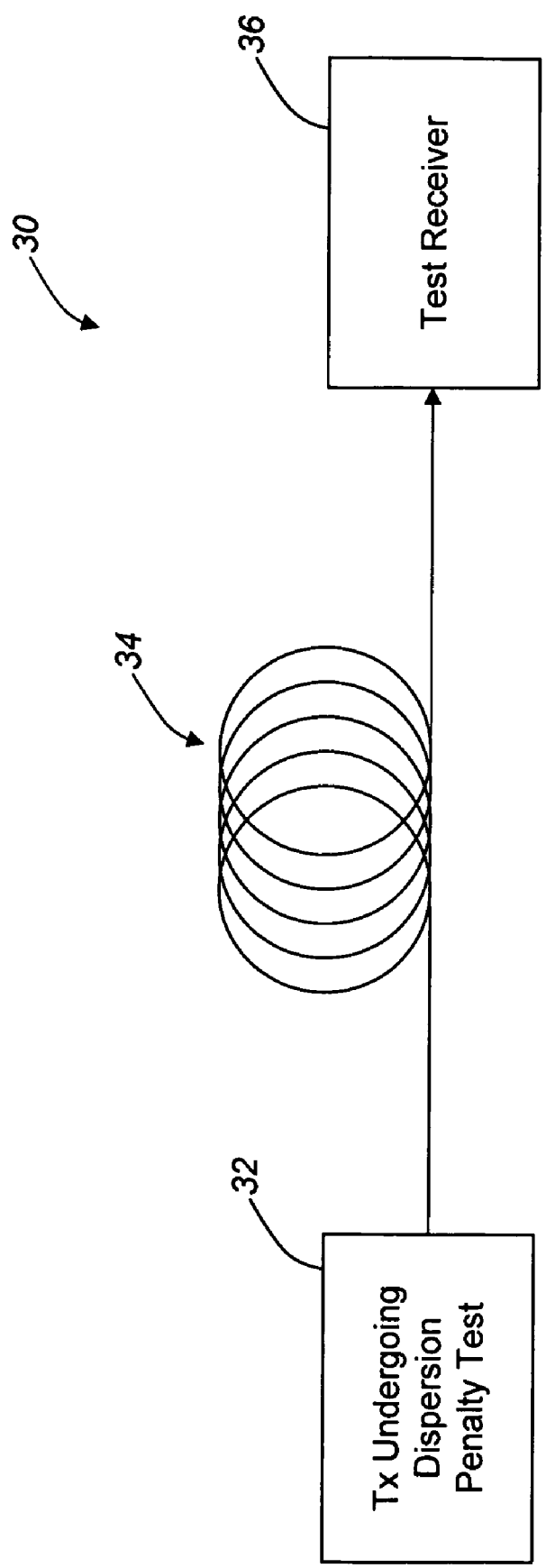
FIG. 2 is a schematic diagram illustrating the conventional system and method for the measurement or testing of the dispersion penalty, or dispersion tolerance, of optical transmitters.

FIG. 2 is a schematic diagram illustrating the conventional system and method for the measurement or testing of the dispersion penalty, or dispersion tolerance, of optical transmitters. The system 30 includes an optical transmitter (Tx) 32 undergoing the dispersion penalty test that is optically coupled to a predetermined physical length of NDSF 34 and a test receiver 36 operable for assessing the total dispersion.

Figure 3:
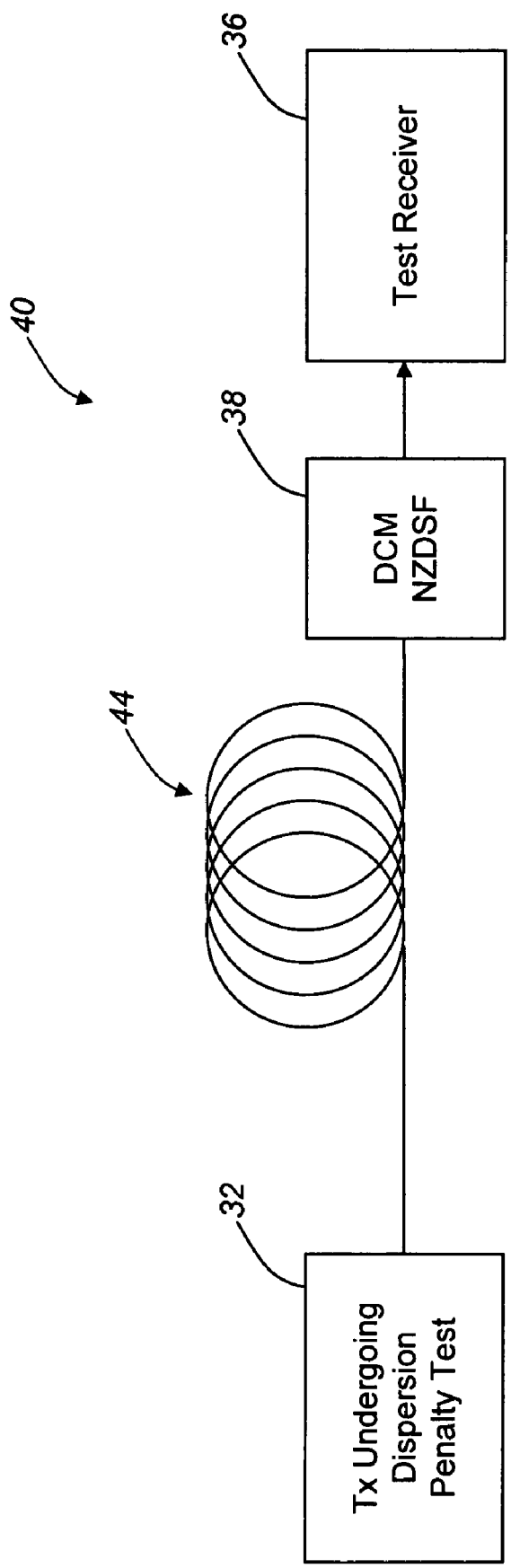
FIG. 3 is a schematic diagram illustrating the system and method for the wavelength independent measurement or testing of the dispersion penalty, or dispersion tolerance, of optical transmitters of the present invention.

FIG. 3 is a schematic diagram illustrating the system and method for the wavelength independent measurement or testing of the dispersion penalty, or dispersion tolerance, of optical transmitters of the present invention. The system 40 includes the Tx 32 undergoing the dispersion penalty test that is optically coupled to a predetermined physical length of NDSF 44, a DCM designed to compensate NZDSF 38, and the test receiver 36 operable for assessing the total dispersion.

In general, a DCM is a passive device that typically includes a spool of fiber that is configured to provide a relatively large amount of positive or negative dispersion in order to compensate for the dispersion and/or dispersion slope of a given length/type of fiber. DCMs have been designed to compensate for both the dispersion and dispersion slope of transmission fiber in order to minimize the dispersion of all wavelength channels in a transmission system. Different types of DCMs have been designed to compensate for dispersion in NDSF and NZDSF for all wavelengths in the C-band. The dispersion slope of NZDSF is comparable to that of NDSF, however, the dispersion magnitude is about one-half. Therefore, a DCM designed to compensate for dispersion in NZDSF has less dispersion magnitude (of the opposite sign), but the wavelength dependence of the dispersion magnitude is equivalent to that of a DCM designed to compensate for dispersion in NDSF.

In order to parameterize this, the total dispersion of a predetermined length of transmission fiber is given by:

$$D_{fiber} = L * [D_{0\_fiber} + D_{slope\_fiber}(\lambda - 1550)] \quad (1)$$

where $D_{0\_fiber}$ is the dispersion per unit length at 1550 nm, $D_{slope\_fiber}$ is the dispersion slope per unit length, and L is the fiber length. The total dispersion of a DCM is given by:

$$D_{DCM} = D_{0\_DCM} + D_{slope\_DCM}(\lambda - 1550) \quad (2)$$

where $D_{0\_DCM}$ is the dispersion at 1550 nm and $D_{slope\_DCM}$ is the dispersion slope. It should be noted that $D_{0\_DCM}$ and $D_{slope\_DCM}$ are typically negative in sign in order to properly compensate fiber dispersion, such that $D_{fiber} = -D_{DCM}$.

By combining the appropriate length of NDSF with a DCM designed for NZDSF, a wavelength independent amount of dispersion can be generated. The dispersion of the combination is given by:

$$D = L * [D_{0\_fiber} + D_{slope\_fiber}(\lambda - 1550)] + D_{0\_DCM} + D_{slope\_DCM}(\lambda - 1550) \quad (3)$$

$$D = L * D_{0\_fiber} + D_{0\_DCM} + [L * D_{slope\_fiber} + D_{slope\_DCM}] * (\lambda - 1550) \quad (4)$$

For wavelength independent dispersion, $$0 = L * D_{slope\_fiber} + D_{slope\_DCM} \quad (5)$$

or $$L = -D_{slope\_DCM} / D_{slope\_fiber} \quad (6)$$

and the amount of wavelength independent dispersion generated is:

$$D = L * D_{0\_fiber} + D_{0\_DCM} \quad (7)$$

Thus, at $D_{slope\_fiber} = 0.061$ ps/nm$^2$/km, the proposed use of 110 km NDSF +DCM designed to compensate 80 km NZDSF targeting 1600 ps/nm dispersion at all wavelengths described above, and the proposed use of 165 km NDSF+ DCM designed to compensate 120 km NZDSF targeting 2400 ps/nm dispersion at all wavelengths also described above, are identified. It will be readily apparent to those of ordinary skill in the art that other suitable combinations can be identified using the method of the present invention and the above equations.

By replacing a single physical length of NDSF selected to provide the necessary dispersion at 1530 nm, for example, with an appropriate single physical length of NDSF and DCM designed for use with NZDSF, the dispersion penalty of optical transmitters of all C-band wavelengths can be measured or tested to approximately the same dispersion magnitude, and the over testing that occurs with the use of a single physical length of NDSF alone can be avoided.

The method for the wavelength independent measurement or testing of the dispersion penalty, or dispersion tolerance, of optical transmitters of the present invention finds application in the measurement or testing of the dispersion penalty, or dispersion tolerance, of all products equipped with dense wavelength division multiplexed (DWDM) optical transmitters, such as 2.5 Gb/s and 10 Gb/s data rate DWDM optical transmitters. Yield improvement can reach 30% by not subjecting higher wavelength optical transmitters, such as 1565 nm optical transmitters and the like, to over testing, with corresponding component cost reduction.

It should be noted that the method of the present invention can also utilize a predetermined physical length of NDSF conforming to ITU standard G.654 (as opposed to G.652) or the like combined with a DCM that is designed for use with DSF conforming to ITU standard G.653 or the like.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method for the wavelength independent measurement or testing of the dispersion penalty, or dispersion tolerance, of optical transmitters, comprising:

selecting a predetermined physical length of non-dispersion shifted fiber (NDSF);

selecting a dispersion compensating module (DCM) that is designed for use with non-zero dispersion shifted fiber (NZDSF), such that, when combined with the predetermined physical length of NDSF, the total dispersion of the two elements is constant as a function of wavelength; and combining the predetermined physical length of NDSF with the DCM that is designed for use with NZDSF, thereby making the total dispersion of the two elements constant as a function of wavelength.

2. The method of claim 1, further comprising selecting the predetermined physical length of NDSF and the DCM based upon a desired total dispersion.

3. The method of claim 1, wherein the length of the predetermined physical length of NDSF is given by:

$$L = -D_{slope\_DCM} / D_{slope\_fiber}$$

where $D_{slope\_DCM}$ is the dispersion slope of the DCM and $D_{slope\_fiber}$ is the dispersion slope per unit length of the predetermined physical length of NDSF.

4. The method of claim 1, wherein the total dispersion of the combined predetermined physical length of NDSF and the DCM is given by:

$$D = L * D_{0\_fiber} + D_{0\_DCM}$$

where L is the length of the predetermined physical length of NDSF, $D_{0\_fiber}$ is the dispersion per unit length of the predetermined physical length of NDSF at a predetermined wavelength, and $D_{0\_DCM}$ is the dispersion of the DCM at the predetermined wavelength.

5. The method of claim 1, further comprising combining the predetermined physical length of NDSF with the DCM in a single setup.

6. The method of claim 2, wherein the desired total dispersion is equivalent to the dispersion tolerance of a 10 Gb/s optical signal.

7. The method of claim 2, wherein the desired total dispersion is 1600 ps/nm.

8. The method of claim 2, wherein the desired total dispersion is 2400 ps/nm.

9. The method of claim 5, further comprising measuring the dispersion penalty, or dispersion tolerance, of a plurality of optical transmitters using the single setup.

10. The method of claim 9, wherein the plurality of optical transmitters comprise a plurality of dense wavelength division multiplexed (DWDM) optical transmitters operating at wavelengths between 1530 nm and 1565 nm.

11. A system for the wavelength independent measurement or testing of the dispersion penalty, or dispersion tolerance, of optical transmitters, comprising:
a predetermined physical length of non-dispersion shifted fiber (NDSF); and
a dispersion compensating module (DCM) that is designed for use with non-zero dispersion shifted fiber (NZDSF) optically coupled to the predetermined physical length of NDSF,
wherein the predetermined physical length of NDSF and the DCM that is designed for use with NZDSF are selected such that the total dispersion of the two elements is constant as a function of wavelength.

12. The system of claim 11, wherein the predetermined physical length of NDSF and the DCM are selected based upon a desired total dispersion.

13. The system of claim 11, wherein the length of the predetermined physical length of NDSF is given by:

$$L = -D_{slope\_DCM}/D_{slope\_fiber}$$

where $D_{slope\_DCM}$ is the dispersion slope of the DCM and $D_{slope\_fiber}$ is the dispersion slope per unit length of the predetermined physical length of NDSF.

14. The system of claim 11, wherein the total dispersion of the combined predetermined physical length of NDSF and the DCM is given by:

$$D = L*D_{0\_fiber} + D_{0\_DCM}$$

where L is the length of the predetermined physical length of NDSF, $D_{0\_fiber}$ is the dispersion per unit length of the predetermined physical length of NDSF at a predetermined wavelength, and $D_{0\_DCM}$ is the dispersion of the DCM at the predetermined wavelength.

15. The system of claim 11, wherein the predetermined physical length of NDSF and the DCM are combined in a single setup.

16. The system of claim 12, wherein the desired total dispersion is equivalent to the dispersion tolerance of a 10 Gb/s optical signal.

17. The system of claim 12, wherein the desired total dispersion is 1600 ps/nm.

18. The system of claim 12, wherein the desired total dispersion is 2400 ps/nm.

19. The system of claim 15, wherein the single setup is operable for measuring the dispersion penalty, or dispersion tolerance, of a plurality of optical transmitters.

20. The system of claim 19, wherein the plurality of optical transmitters comprise a plurality of dense wavelength division multiplexed (DWDM) optical transmitters operating at wavelengths between 1530 nm and 1565 nm.

21. A method for the wavelength independent measurement or testing of the dispersion penalty, or dispersion tolerance, of optical transmitters, comprising:
selecting a predetermined physical length of non-dispersion shifted fiber (NDSF);
selecting a dispersion compensating module (DCM) that is designed for use with one of non-zero dispersion shifted fiber (NZDSF) and dispersion shifted fiber (DSF), such that, when combined with the predetermined physical length of NDSF, the total dispersion of the two elements is constant as a function of wavelength and
combining the predetermined physical length of NDSF with the DCM that is designed for use with one of NZDSF and DSF, thereby making the total dispersion of the two elements constant as a function of wavelength.

* * * * *